United States Patent
Fujino et al.

(10) Patent No.: US 6,893,778 B2
(45) Date of Patent: May 17, 2005

(54) LITHIUM POLYMER CELL

(75) Inventors: Akiko Fujino, Hirakata (JP); Shinji Mino, Ibaraki (JP); Hiroshi Yoshizawa, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/239,021

(22) PCT Filed: Feb. 20, 2002

(86) PCT No.: PCT/JP02/01511

§ 371 (c)(1),
(2), (4) Date: Sep. 18, 2002

(87) PCT Pub. No.: WO02/067355

PCT Pub. Date: Aug. 29, 2002

(65) Prior Publication Data

US 2003/0162097 A1 Aug. 28, 2003

(30) Foreign Application Priority Data

Feb. 22, 2001 (JP) .................................... 2001-047279

(51) Int. Cl.⁷ .............................................. H01M 6/16
(52) U.S. Cl. ..................... 429/326; 429/332; 429/254; 429/342
(58) Field of Search .................................. 429/326, 332, 429/254, 342

(56) References Cited

U.S. PATENT DOCUMENTS 6,503,661 B1 * 1/2003 Park et al. .................. 429/306
2002/0192565 A1 * 12/2002 Ueda et al. ................. 429/332

FOREIGN PATENT DOCUMENTS

JP          2000-058117      *  2/2000

* cited by examiner

Primary Examiner—Laura Weiner
(74) Attorney, Agent, or Firm—McDermott Will & Emery LLP

(57) ABSTRACT

In a lithium polymer battery of the present invention, a positive electrode, an negative electrode and a separator respectively contain a vinylidene fluoride-hexafluoropropylene copolymer, an electrolyte contains a solvent comprising diethyl carbonate and a solute dissolved in the solvent, and the electrolyte further contains diphenyl ether as an additive.

With the use of the above electrolyte, it is possible to improve the thermal stability of the battery containing P(VDF-HFP) in the positive electrode, the negative electrode and the separator and to operate the shutdown function surely, thereby ensuring the excellent safety of the battery.

9 Claims, 2 Drawing Sheets

LITHIUM POLYMER CELL

TECHNICAL FIELD

The present invention relates to an improvement of a lithium polymer battery with a positive electrode, a negative electrode and a separator respectively containing a vinylidene fluoride-hexafluoropropylene copolymer (hereinafter, referred to as P(VDF-HFP)).

BACKGROUND ART

Recently a thin and light lithium polymer battery with a high energy density draws attention, and the development of the battery is proceeded to obtain a higher capacity. Many of lithium polymer batteries contain P(VDF-HFP) capable of retaining an electrolyte in the positive electrodes, negative electrodes and separators. By retaining the electrolyte in P(VDF-HFP), the conductivity of lithium ion is secured. As described above, the lithium polymer battery has the electrolyte retained in the polymer, and has less free electrolyte than in the case of a normal lithium ion battery. Therefore, the lithium polymer battery is expected as a battery being more excellent in safety than a normal lithium ion battery.

However, when the battery is in the overcharged state at a high temperature by a malfunction of a protection circuit, which is installed on a battery charger, a battery package or the like, even the lithium polymer battery excellent in safety possibly may cause the temperature of the battery to rise abnormally. Since the lithium ions in a lithium-containing positive active material extremely decrease and excess lithium ions are supplied to a negative active material, the battery in the overcharged state is thermally unstable. Especially, when the battery is exposed to a temperature around 80° C. in the overcharged state, the exothermic reaction occurs between the positive active material and negative active material, and the electrolyte, both in the active state, and the rate of the reaction is accelerated rapidly. This causes a phenomenon of, what is called, a thermal overdrive to occur to increase the temperature of the battery rapidly.

For example, there is disclosed in Japanese Unexamined Patent Publication No. hei 12-058065 an improvement in safety of the lithium polymer battery. This publication proposes to apply a porous polymer such as polyvinylidene fluoride (hereinafter, referred to as PVDF) having the shutdown function on the surface of at least one of the positive electrode and the negative electrode. In this case, the interruption of the current occurs at a high temperature (100–110° C.) by an operation of the shutdown function. As a result, the rise of the temperature of the battery is suppressed and the safety of the battery is improved. However, there is a problem that the energy density of the battery decreases if the PVDF is further added into the polymer battery containing P(VDF-HFP). Then, if a part of P(VDF-HFP) is replaced with PVDF, free electrolyte increases and, therefore, the advantage of the polymer battery decreases.

Here, the shutdown function means the function of the separator as described below. Namely, in the non-aqueous electrolyte secondary battery, when the short-circuit occurs in the battery or the battery is overcharged at a large amount of current, the temperature of the battery rises by heat generated in the battery. At that time, the pores of the porous separator are closed by softening or melting of the separator. This causes the insulating membrane to be formed and the internal resistance of the battery to increase and, then, the current is shut down to prevent the battery from generating heat.

On the other hand, many additives have recently been proposed as a disclosure for an improvement in safety of the lithium ion battery which dose not contain P(VDF-HFP) in the separator. For example, Japanese Patent No. 2983205 proposes to add an ether derivative to the electrolyte. The ether derivative produces a polymer when the battery is overcharged. Since this works as the resistor, the safety of the battery is improved in the overcharged state.

However, even if the ether derivative is added to the lithium polymer battery containing P(VDF-HFP) in the separator, this is not enough to secure the safety of the battery in the overcharged state. Especially, there is a problem that when the polymer battery in the overcharged state is exposed to a high temperature, the phenomenon of the thermal overdrive tends to occur. This is presumably ascribed to the facts that P(VDF-HFP) has a property to swell by absorbing the electrolyte unlike the polymer such as PVDF and the swelling is promoted especially at a high temperature, and that conventionally an appropriate combination of the ether derivative and the electrolyte has not been found out.

First, if the porous separator comprising P(VDF-HFP) swells by absorbing the electrolyte, the pores of the separator are closed by the electrolyte. In this case, the separator changes by itself to have a condition having the ion conductivity, which is a preferable condition for performing normal charge and discharge, and the movement of lithium ions is promoted. Moreover the higher the temperature becomes, the more easily the movement of the lithium ions is promoted. At the same time, however, the shutdown function does not operate for the separator in the swollen state with the absorbed electrolyte. Therefore, in the case of the lithium polymer battery using the separator comprising P(VDF-HFP), it cannot fully suppress the thermal overdrive occurring when the battery is exposed to a high temperature in the overcharged state.

Also, in the lithium ion battery and the lithium polymer battery, it is conventional to use the electrolyte containing ethylene carbonate (EC), dimethyl carbonate (DMC) and ethylmethyl carbonate (EMC) as the solvent. However, when the combination of the ether derivative and the electrolyte is not appropriate, it is possible that the polymerization of the ether derivative is suppressed and the ether derivative inhibits the shutdown function of the P(VDF-HFP).

DISCLOSURE OF INVENTION

The present invention is based on findings of a composition of the electrolyte which makes it hard to swell the separator comprising P(VDF-HFP) even at a high temperature, and of an ether derivative to be thought to have an affinity with the above electrolyte, polymerize rapidly during the overcharging state and promote the softening of the P(VDF-HFP).

Namely, the present invention relates to a lithium polymer battery comprising: an electrode assembly including a positive electrode, a negative electrode and a separator interposed between the positive electrode and negative electrode; and an electrolyte retained in the electrode assembly, characterized in that the positive electrode, negative electrode and separator respectively contain a vinylidene fluoride-hexafluoropropylene copolymer, the electrolyte contains a solvent comprising diethyl carbonate (hereinafter, referred to as DEC) and a solute dissolved in the solvent, and the electrolyte further contains diphenyl ether (hereinafter, referred to as DPE) as an additive.

As a first preferable mode, it is preferable that said solvent is a mixture solvent containing DEC and ethylene carbonate (hereinafter, referred to as EC). In this case, it is preferable that the volumetric proportion of DEC is 50 to 80% by volume in the mixture solvent. It is preferable that the volumetric proportion of EC is 20 to 50% by volume in the mixture solvent.

As s second preferable mode, it is preferable that said solvent is a mixture solvent containing DEC and EC, further containing at least one selected from the group consisting of a second chain carbonate other than DEC, a second cyclic carbonate other than EC, a chain ester, a cyclic ester and a cyclic ether. In this case, it is preferable that the volumetric proportion of DEC is 25 to 50% by volume in the mixture solvent. It is preferable that the volumetric proportion of EC is 20 to 60% by volume in the mixture solvent. It is preferable that the volumetric proportion of at least one selected from the group consisting of a second chain carbonate, a second cyclic carbonate, a chain ester, a cyclic ester and a cyclic ether is 5 to 55% by volume in the mixture solvent.

It is preferable that the content of DPE is 1 to 7% by weight of a total of the electrolyte.

BRIEF DESCRIPTION 0F DRAWINGS

FIG. 2 is a sectional view taken on line A–B in FIG. 1.

BEST MODE FOR CARRYING OUT THE INVENTION

Figure 1:
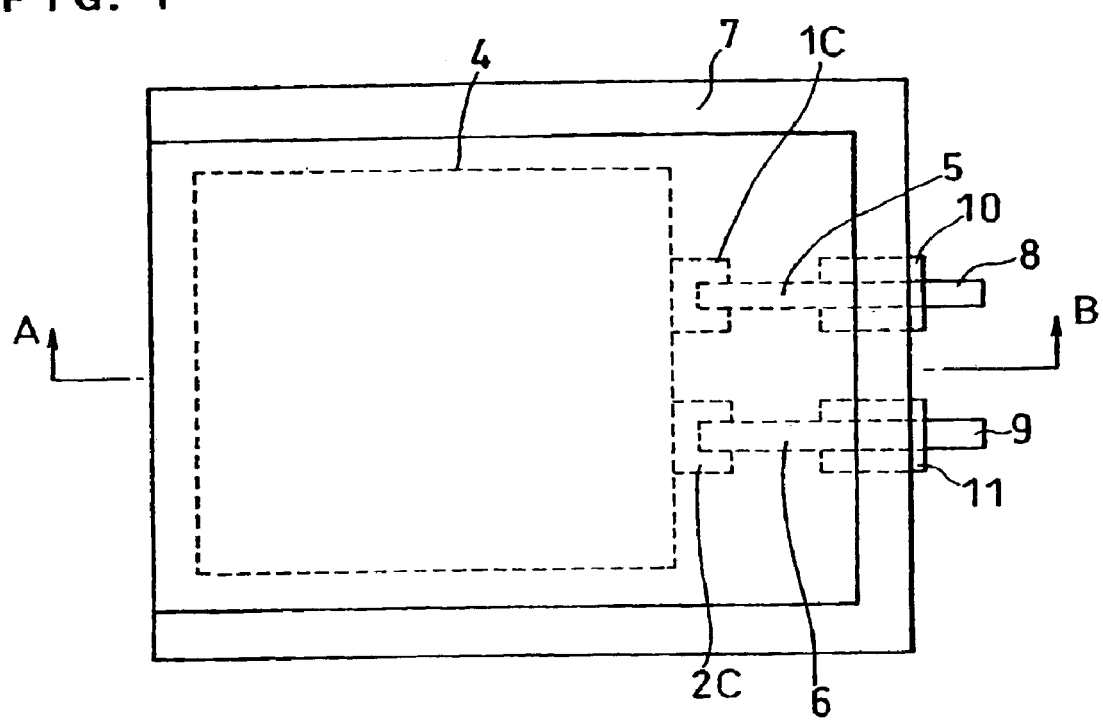
FIG. 1 is an upper view showing a battery in an example of the present invention.

In the lithium polymer battery of the present invention, a positive electrode, a negative electrode and a separator contain P(VDF-HFP) respectively. P(VDF-HFP) functions as a binder of an electrode material and an electrolyte retainer in the positive electrode and negative electrode. It is noted that in the positive electrode and negative electrode, a part of P(VDF-HFP) may be replaced with PVDF. In the separator, P(VDF-HFP) functions as a main component. A micro porous film comprising P(VDF-HFP) is preferably used as a separator.

As a positive electrode active material, a metal oxide containing lithium such as lithium cobalt oxide is employed, for instance.

As a negative electrode active material, a carbon material such as graphite or carbon black is employed, for instance.

It is preferable that the amount of P(VDF-HFP) contained in the positive electrode is 5 to 10 parts by weight per 100 parts by weight of the positive electrode active material. It is preferable that the amount of P(VDF-HFP) contained in the negative electrode is 5 to 15 parts by weight per 100 parts by weight of the negative electrode active material.

The positive electrode, the negative electrode and the separator are integrated by melting and binding them by the effect of P(VDF-HFP) contained therein to obtain an electrode assembly comprising the positive electrode, the negative electrode and the separator interposed between them.

It is preferable that a mole ratio of a vinylidene fluoride unit to a hexafluoropropylene unit, which constitute P(VDF-HFP), is 8:92 to 20:80. It is preferable that a molecular weight of P(VDF-HFP) is 300 to 600.

The electrolyte of the lithium polymer battery of the present invention contains a solvent comprising DEC and a solute dissolved in the solvent. The electrolyte further contains DPE as an additive.

The micro-porous film separator comprising P(VDF-HFP) is impregnated with the electrolyte, and the electrolyte is retained in the electrode assembly as it is absorbed in P(VDF-HFP), which is contained in the positive electrode and the negative electrode.

As a solute of the electrolyte, a salt of lithium such as $LiPF_6$, $LiClO_4$, $LiBF_4$, $LiAlCl_4$, $LiSCN$, $LiCF_3SO_3$, $LiCF_3CO_2$, LiCl, LiBr or LiI is used. It is preferable that the concentration of the solute in the electrolyte is 0.8 to 1.5 mol/l.

A first preferable mode of the solvent used in the above electrolyte may be exemplified by the mixture solvent containing EC and DEC. In this case, it is preferable that the volumetric proportion of DEC in the mixture solvent is 50 to 80% by volume. Especially, it is preferable that the volumetric proportion of DEC is 50 to 70% by volume. It is preferable that the volumetric proportion of EC in the mixture solvent is 20 to 50% by volume.

When the volumetric proportion of DEC in the above mixture solvent is not less than 50% by volume, the electrolyte is not excessively absorbed in P(VDF-HFP), so that the swelling of the separator can be suppressed. This causes the amount of the electrolyte existing on the surfaces of the positive electrode active material and the negative electrode active material and in the vicinity of the electrode surface to be kept appropriately. For this reason, the exothermic reaction between each of the positive electrode active material and negative electrode active material, and the electrolyte is alleviated, and the thermal stability of the battery is improved. However, when the volumetric proportion of DEC in the mixture solvent is more than 80% by volume, the volumetric proportion of EC having a high dielectric constant decreases to lower a dissociation degree of a salt of lithium. Therefore, the discharge characteristic is lowered at high rate discharge.

Also, a second preferable mode of the solvent used in the above electrolyte may be exemplified by a mixture solvent containing DEC and EC and further containing at least one selected from the group consisting of a second chain carbonate other than DEC, a second cyclic carbonate other than EC, a chain ester, a cyclic ester and a cyclic ether. In this case, it is preferable that the volumetric proportion of DEC in the mixture solvent is 25 to 50% by volume. It is preferable that the volumetric proportion of EC is 20 to 60% by volume. It is preferable that the volumetric proportion of at least one selected from the group consisting of a second chain carbonate other than DEC, the second cyclic carbonate other than EC, the chain ester, the cyclic ester and the cyclic ether, is 5 to 55% by volume.

The above mixture solvent contains at least one selected from the group consisting of the second chain carbonate, the second cyclic carbonate, the chain ester, the cyclic ester and the cyclic ether, other than DEC and EC. Therefore, in order to suppress the swelling of P(VDF-HFP), it is sufficient that the volumetric proportion of DEC in the mixture solvent is not less than 25% by volume. This provides the same effect as in the lithium polymer battery using the first mode mixture solvent comprising DEC and EC. Also, when the volumetric proportion of DEC in the mixture solvent is more than 50% by volume, the battery property is lowered.

As an additive of the electrolyte, DPE is used. When the battery is in the overcharged state, DPE is polymerized and the membrane not having the ion conductivity is formed on the positive electrode active material and on the surface of the positive electrode. For this reason, the exothermic reaction between the positive electrode and the electrolyte is suppressed. It is noted that even in the case of using the combination of the electrolyte containing DEC with the ether derivative other than DPE, the thermal overdrive cannot be suppressed at a high temperature and, therefore, it is thought that DPE and the electrolyte containing DEC have a specially good affinity. Though it is possible that DPE promotes the softening of P(VDF-HFP) due to the remarkable effect of suppressing the thermal overdrive, the detail in terms of the effect is unknown. Therefore, the lithium polymer battery, which is more excellent in safety, can be obtained by adding DPE to the electrolyte. It is preferable that the content of DPE is 1 to 7% by weight of a total of the electrolyte. When the content of DPE is less than 1% by weight of the electrolyte, the effect of suppressing the heat generation during overcharging is not enough and, when it is more than 7% by weight of the electrolyte, there is a fear that the charge-discharge characteristic of the battery is deteriorated.

Here, in the lithium polymer battery containing P(VDF-HFP) in the positive electrode, the negative electrode and the separator, using the solvent comprising DEC for the electrolyte and further containing DPE as an additive, it has been confirmed firstly that the heat generation occurring around 80° C., which is observed when the battery in the overcharged state is exposed to a high temperature, is alleviated. Then, by the alleviation of the heat generation occurring around 80° C., even if the temperature of the battery further rises up to 90 to 110° C., the shutdown function by P(VDF-HFP) effectively operates to interrupt the current. Therefore, it can be described that the combination of DPE and the electrolyte containing DEC is effective to alleviate at least the heat generation in the polymer battery occurring around 80° C.

In the case of using the electrolyte containing only chain carbonate other than DEC, the shutdown function of P(VDF-HFP) does not operate. On the other hand, in the case of using the electrolyte of the present invention, the shutdown function operates so that the swelling of P(VDF-HFP) is suppressed.

As the second chain carbonate other than DEC, ethylmethyl carbonate, dimethyl carbonate or the like can be used. These may be used either alone or in combination of two or more of them.

As the second cyclic carbonate other than EC, propylene carbonate (PC), butylene carbonate or the like can be used. These may be used either alone or in combination of two or more of them.

As the cyclic ester, γ-butyrolactone or the like can be used.

As the chain ester, methyl propionate, ethyl propionate or the like can be used. These may be used either alone or in combination of two or more of them.

As the cyclic ether, tetrahydrofuran or the like can be used.

In order to make the shutdown function operate more reliably and to improve the battery property, it is especially preferable to use PC among these solvents. In the case of using PC having a high dielectric constant as well as EC, the amount of EC to be used can be decreased. Further, the characteristic at low temperatures is improved because the melting point of PC is lower than that of EC.

It is preferable that the ratio by volume of the mixture solvent containing EC, DEC and PC is EC:DEC:PC=20 to 50:25 to 45:5 to 55 (100 in total).

In the following, the present invention will be described in detail by reference to examples.

EXAMPLE 1

FIG. 1 is an upper view showing a lithium polymer battery prepared in each example, and FIG. 2 is a sectional view taken on line A–B thereof.

(i) Fabrication of Positive Electrode 100 parts by weight of lithium cobalt oxide ($LiCoO_2$) as a positive electrode active material and 5 parts by weight of acetylene black as a conductive agent were dispersed in N-methyl-2-pyrolydone (hereinafter, referred to as NMP). Into the resultant dispersion, 8 parts by weight of P(VDF-HFP) powder as a binder or an electrolyte retainer per 100 parts by weight of lithium cobalt oxide ($LiCoO_2$) was dissolved to obtain a paste. The P(VDF-HFP) used herein is composed of vinylidene fluoride unit and hexafluoropropylene unit at a monomer ratio of 88:12, and has a molecular weight of 477. This paste was applied on both sides of a positive electrode current collector $1a$ made of a lath aluminum (hereinafter, referred to as Al) foil and the whole was dried to form a positive electrode mixture layer $1b$, thereby obtaining a positive electrode 1.

(ii) Fabrication of Negative Electrode

Carbon powder as a negative electrode active material was dispersed in NMP. Into the resultant dispersion 15 parts by weight of the same P(VDF-HFP) powder as that used in the positive electrode as a binder or an electrolyte retaining agent per 100 parts by weight of the carbon powder was dissolved to obtain a paste. This paste was applied on both sides of a negative electrode current collector $2a$ made of a lath copper foil and the whole was dried to form a negative electrode mixture layer $2b$, thereby obtaining a negative electrode 2.

(iii) Fabrication of Separator

A paste, which had been obtained by mixing 100 parts by weight of the same P(VDF-HFP) powder as that used in the positive electrode and 100 parts by weight of dibutyl phthalate (hereinafter, referred to as DBP) in NMP, was formed in a shape of membrane, and NMP was volatilized. Then, the obtained membrane was soaked in diethyl ether, and DBP was extracted to produce a micro-porous film separator 3 made of P(VDF-HFP).

(iv) Fabrication of Electrode Assembly

Two positive electrodes 1 were placed facing each other, and the micro-porous film separator 3 comprising P(VDF-HFP) was disposed at the inner side of each of the two positive electrodes 1. Then, the negative electrode 2 was disposed between the two separators 3 facing each other, and each of the electrodes and the separators 3 were bonded by welding and integrated to constitute an electrode assembly 4.

(v) Assembly of Battery

A lead attaching part 1C was provided in the positive electrode current collector $1a$, and a positive electrode lead 5 made of Al foil was connected thereto by welding. A lead attaching part 2C was provided in the negative electrode collector $2a$, and a negative electrode lead 6 made of copper foil was connected thereto by welding.

On the other hand, an outer jacket 7 in a bag shape comprising an Al laminated film was prepared. This laminated film comprises Al foil, a film made of polypropylene placed at the inner side thereof and a film made of polyethylene terephthalate and nylon placed at the outer side thereof.

The electrode assembly 4 was accommodated in the inside of the outer jacket 7. The end of the positive electrode lead 5 and the end of the negative electrode lead 6 drawn to the outside of the outer jacket 7 were respectively used as a positive electrode terminal 8 and a negative electrode terminal 9. Insulating films 10 and 11 were respectively provided in the intermediate parts of the positive electrode lead 5 and the negative electrode lead 6.

$LiPF_6$ was dissolved at 1.25 mol/l in each mixture solvent of EC and DEC having a composition shown in Table 1 to prepare 7 types of electrolytes. DPE as an additive was mixed to each electrolyte so that the amount of DPE was 4% by weight of the electrolyte in total. By impregnating the electrode assembly 4 with each electrolyte and heating the electrode assembly 4 containing the electrolyte up to 45° C., the electrolyte was retained in the electrode assembly 4.

Further, the opening of the outer jacket 7 was sealed by heat welding. By means of the insulating films 10 and 11, the electric insulation between the positive electrode lead 5 and the negative electrode lead 6 and the airtightness were secured in sealing the opening of the outer jacket 7 by heat welding.

In this manner, lithium polymer batteries "a" to "g" were produced.

TABLE 1

| Battery | Solvent composition (vol. %) | | Additive | Exothermic amount (J) | 2C/0.2C (%) |
|---|---|---|---|---|---|
| | EC | DEC | | | |
| a | 60 | 40 | DPE | 200 | 56 |
| b | 55 | 45 | | 160 | 63 |
| c | 50 | 50 | | 85 | 75 |
| d | 40 | 60 | | 70 | 81 |
| e | 30 | 70 | | 72 | 78 |
| f | 20 | 80 | | 69 | 40 |
| g | 10 | 90 | | 65 | 10 |

EXAMPLE 2

$LiPF_6$ was dissolved at 1.25 mol/l in each mixture solvent of EC, PC and/or DEC having a composition shown in Table 2 to prepare 5 types of electrolytes. Further, DPE as an additive was respectively mixed in each electrolyte so that the amount of DPE was 4% by weight of the electrolyte in total. The batteries "h" to "l" were produced by using these electrolytes.

TABLE 2

| Battery | Solvent composition (vol. %) | | | Additive | Exothermic amount (J) |
|---|---|---|---|---|---|
| | EC | DEC | PC | | |
| h | 50 | 0 | 50 | DPE | 320 |
| i | 50 | 20 | 30 | | 290 |
| j | 50 | 25 | 25 | | 130 |
| k | 50 | 30 | 20 | | 115 |
| l | 50 | 50 | 0 | | 85 |

Comparative Example 1

$LiPF_6$ was dissolved at 1.25 mol/l in the mixture solvent having a mixture ratio by volume of EC:EMC=30:70 to prepare an electrolyte. The battery "m" was prepared by using another electrolyte. The battery "n" was prepared by using the electrolyte, which was obtained by further mixing DPE in the above electrolyte so that the amount of DPE was 4% by weight of the electrolyte in total. The details of these batteries were shown in Table 3.

TABLE 3

| Battery | Solvent composition (vol. %) | | Additive | Exothermic amount (J) | 2C/0.2C (%) |
|---|---|---|---|---|---|
| | EC | EMC | | | |
| m | 30 | 70 | None | 310 | 88 |
| n | 30 | 70 | DPE | 240 | 85 |

Comparative Example 2

$LiPF_6$ was dissolved at 1.25 mol/l in the mixture solvent having a mixture ratio by volume of EC:DEC=30:70 to prepare an electrolyte. The battery "o" was prepared by using this electrolyte. Various additives other than DPE were further mixed in this electrolyte respectively so that the amount of each additive was 4% by weight of the electrolyte in total. The batteries "p" to "s" were prepared by using these electrolytes. The details of these batteries were shown in Table 4.

TABLE 4

| Battery | Solvent composition (vol. %) | | Additive | Exothermic amount (J) | 2C/0.2C (%) |
|---|---|---|---|---|---|
| | EC | DEC | | | |
| o | 30 | 70 | None | 190 | 87 |
| p | | | o-terphenyl | 170 | 43 |
| q | | | Biphenyl | 180 | 47 |
| r | | | Cyclohexyl-benzene | 185 | 53 |
| s | | | Trifluoroethyl-carbamate | 195 | 70 |

Comparative Example 3

$LiPF_6$ was dissolved at 1.25 mol/l in the mixture solvent having a mixture ratio by volume was EC:PC:DEC=50:25:25 to prepare an electrolyte. Various additives other than DPE was further mixed in this electrolyte respectively so that the amount of each additive was 4% by weight of the electrolyte in total. The batteries "t" to "w" were prepared by using these electrolytes. The details of these batteries were in Table 5.

TABLE 5

| Battery | Solvent composition (vol. %) | | | Additive | Exothermic amount (J) | 2C/0.2C (%) |
|---|---|---|---|---|---|---|
| | EC | PC | DEC | | | |
| t | 50 | 25 | 25 | o-terphenyl | 220 | 40 |
| u | | | | Biphenyl | 250 | 38 |
| v | | | | Cycrohexyl-benzene | 260 | 45 |
| w | | | | Trifluoroethyl-carbamate | 260 | 64 |

[Evaluation of Battery]
(i) Measurement of Exothermic Amount

With respect to each of sample batteries "a" to "w" for measuring exothermic amount, which were prepared in Examples 1 to 2 and Comparative Examples 1 to 3, the exothermic condition at a high temperature in the overcharged state was evaluated. Firstly, each sample battery was charged at 500 mA for two hours (up to a charge depth of 200%). Then, each battery was placed in a container for heating, and the temperature of each battery and the temperature of the inside of the container were measured while raising the temperature in the container at 1° C./min. At this time, the temperature of each battery became higher than that of the inside of the container so that the exothermic reaction occurs in each battery around 80° C. The exothermic amount (J) of each battery was estimated by calculating the product of the lapsed time from the time when the difference of temperature between each battery and the inside of the container occured, by the difference of temperature, and then multiplying the product by an experimentally calculated constant. The results of evaluations were shown in Tables 1 to 5.

(ii) Discharge Test

With respect to each of sample batteries "a" to "g" and "m" to "w" for discharge test, the discharge characteristic thereof was evaluated at room temperature. Firstly, each sample battery was charged at 100 mA until the battery voltage reached 4.2 V. Then, each battery was discharged at 100 mA (0.2C) until the battery voltage reached a terminal voltage of 3 V to measure a discharge capacity.

Further, each sample battery was charged at 100 mA until the battery voltage reached 4.2 V. Thereafter, each battery was discharged at 1000 mA (2C) until the battery voltage reached a terminal voltage of 3 V to measure a discharge capacity. Then, the ratio of a discharge capacity at 2C to a discharge capacity at 0.2C (2C/0.2C) was calculated. This value of each battery was shown by percentage in Tables 1 and 3 to 5.

Comparing the battery "m" in Table 3 with the battery "o" in Table 4, it is found that the exothermic amount is decreased and the thermal stability is improved when the solvent contains DEC. Moreover, comparing the battery "o" in Table 4 with the battery "e" in Table 1, it is found that the exothermic amount is further decreased remarkably by adding DPE in the electrolyte using the mixture solvent having a volumetric proportion of DEC of 70% by volume.

Moreover, the batteries "a" to "g" and "m" to "w" were continuously overcharged at 3C separately. As a result, it was confirmed that in the battery "e" of the present invention, the thermal overdrive due to an abnormal rising of the battery temperature was suppressed and the shutdown of P(VDF-HFP) occurred around 90° C. by the lowering of the exothermic amount. On the other hand, in the batteries "m", "n" and "o" each using the conventional electrolyte, the shutdown was not observed. This demonstrates that the shutdown can occur surely by using the electrolyte of the present invention as in the battery "e".

Figure 3:
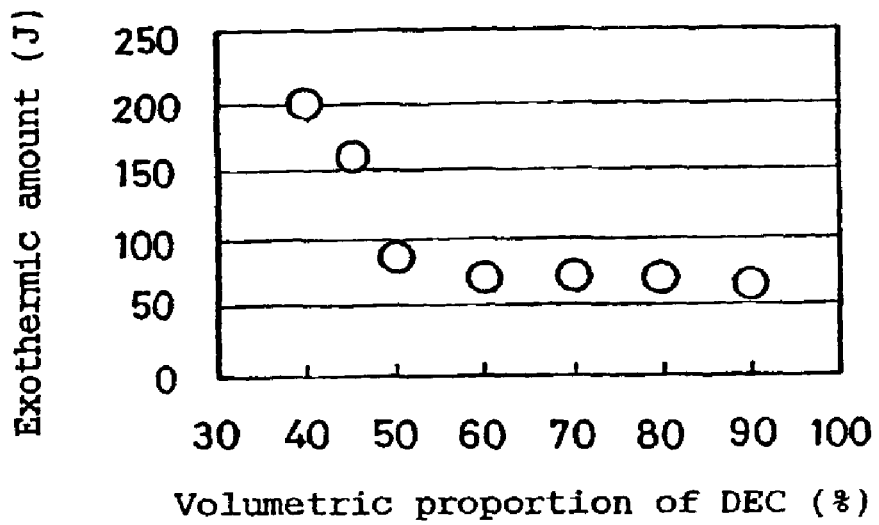
FIG. 3 is a graph showing relations between an exothermic amount of the battery in the overcharged state using the mixture solvent containing EC and DEC and a volumetric proportion of DEC in the mixture solvent.

In the batteries "a" to "g" in Table 1, it is observed that the exothermic amounts of the batteries "a" and "b", in which the volumetric proportion of DEC is low, are large, and the exothermic amount tends to decrease by increasing DEC. Especially, the exothermic amount decreases remarkably by adding not less than 50% of DEC. Also, the tendency is obvious from FIG. 3 showing relations between the volumetric proportion of DEC and the exothermic amount.

Figure 4:
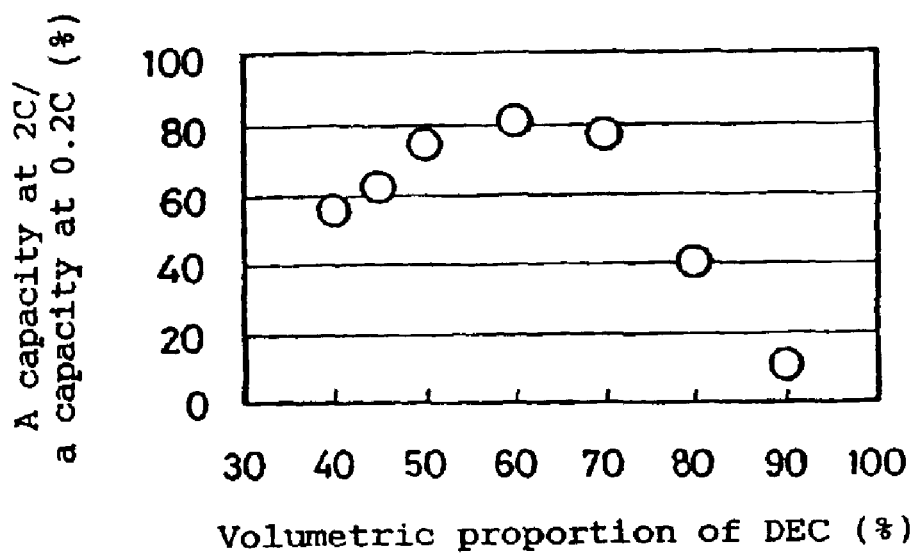
FIG. 4 is a graph showing relations between a ratio of a discharge capacity at 2C to a discharge capacity at 0.2C (a capacity at 2C/a capacity at 0.2C) and a volumetric proportion of DEC in the mixture solvent containing EC and DEC, in the case of the battery using the mixture solvent.

Further, in the batteries "a" to "g" in Table 1, high rate discharge characteristic is improved because the ion conductivity is improved by the lowering of the viscosity of the electrolyte when the volumetric proportion of DEC is increased. In the battery "g" in which the volumetric proportion of DEC is further increased to 90% by volume, the dissociation of a salt of lithium is lowered because the volumetric proportion of EC having a high dielectric constant is decreased. Therefore, the discharge characteristic is lowered in the case of a high rate discharge. Also, the tendency is obvious from FIG. 4 showing relations between the volumetric proportion of DEC and a ratio of a discharge capacity (2C/0.2C).

Therefore, it was proved that the thermal stability and the discharge characteristic were excellent, when the volumetric proportion of DEC was 50 to 80% by volume, especially 50 to 70% by volume.

Further, assuming that the battery is erroneously overcharged at an extremely large amount of current during the use of the battery, the overcharging test at 3C was conducted separately. As a result, in the batteries "c" to "g", the improvement of the thermal stability prevented the battery temperature from rising abnormally. At the same time, it was confirmed that the safety of the battery during overcharging was secured because the shutdown of P(VDF-HFP) in the electrodes and the separators could occur surely.

In the batteries "h" to "l" in Table 2, it can be seen that the exothermic amount is large in the batteries "h" and "i", in which the volumetric proportion of DEC is low, and the exothermic amount tends to decrease by increasing DEC. Especially, the exothermic amount is decreased remarkably when the volumetric proportion of DEC is 20 to 25% by volume. Further, in the batteries "j" to "l" of which the exothermic amounts are low, the same effect is observed even in the case of overcharging at 3C. The improvement of the thermal stability prevents the battery temperature from rising abnormally. At the same time, the safety of the battery can be secured during overcharging because the shutdown of P(VDF-HFP) in the electrodes and the separators can occur surely.

In the batteries "p" to "w" in Tables 4 and 5, the exothermic amounts thereof are equal to or more than that of the battery "o" in Table 4 using no additive, and the discharge characteristics thereof are lowered remarkably in the case of a high rate discharge. This demonstrates that each additive shown in Tables 4 and 5 has a reverse effect. Considering all the results of Tables 1 to 5, it is found that DPE among many additives acts on a special effectivity.

Industrial Applicability

According to the present invention, it is possible to improve the thermal stability during overcharging of a lithium polymer battery, in which a positive electrode, a negative electrode and a separator thereof contain P(VDF-HFP), to cause the shutdown function operate reliably and to provide a lithium polymer battery excellent in safety.

What is claimed is:

1. A lithium polymer battery comprising: an electrode assembly including a positive electrode, a negative electrode and a separator interposed between said positive electrode and negative electrode; and an electrolyte retained in said electrode assembly, characterized in that said positive electrode, negative electrode and separator respectively contain a vinylidene fluoride-hexafluoropropylene copolymer, said electrolyte contains a solvent comprising diethyl carbonate and a solute dissolved in said solvent, and said electrolyte further contains diphenyl ether as an additive.

2. The lithium polymer battery in accordance with claim 1, wherein said solvent is a mixture solvent containing 50 to 80% by volume of diethyl carbonate and 20 to 50% by volume of ethylene carbonate.

3. The lithium polymer battery in accordance with claim 1,
   wherein said solvent is a mixture solvent containing ethylene carbonate and diethyl carbonate and further containing at least one selected from the group consisting of a second chain carbonate, a second cyclic carbonate, a chain ester, a cyclic ester and a cyclic ether, and the content of diethyl carbonate is 25 to 50% by volume of a total of said mixture.

4. The lithium polymer battery in accordance with claim 1,
   wherein the content of said diphenyl ether is 1 to 7% by weight of a total of said electrolyte.

5. A lithium polymer battery comprising: an electrode assembly including a positive electrode, a negative electrode and a separator interposed between said positive electrode and negative electrode; and an electrolyte retained in said electrode assembly,
   characterized in that said positive electrode, negative electrode and separator respectively contain a vinylidene-fluoride-hexafluoropropylene copolymer, and said electrolyte contains: (i) a solvent comprising 50 to 80% by volume of diethyl carbonate, (ii) a solute dissolved in said solvent, and (iii) 1 to 7% by weight of diphenyl ether as an additive.

6. The lithium polymer battery in accordance with claim 5,
   wherein said solvent further contains ethylene carbonate.

7. A lithium polymer battery comprising: an electrode assembly including a positive electrode, a negative electrode and a separator interposed between said positive electrode and negative electrode; and an electrolyte retained in said electrode assembly,
   characterized in that said positive electrode, negative electrode and separator respectively contain a vinylidene-fluoride-hexafluoropropylene copolymer, and said electrolyte contains: (i) a solvent comprising 25 to 50% by volume of diethyl carbonate and ethylene carbonate, and further containing at least one selected from the group consisting of a second chain carbonate, a second cyclic carbonate, a chain ester, a cyclic ester and a cyclic ether, and (ii) a solute dissolved in said solvent, and (iii) 1 to 7% by weight of diphenyl ether as an additive.

8. The lithium polymer battery in accordance with claim 7, wherein said second chain carbonate is ethylmethyl carbonate, dimethyl carbonate, or both.

9. The lithium polymer battery in accordance with claim 7,
   wherein said second cyclic carbonate is propylene carbonate.

* * * * *

UNITED STATES PATENT AND TRADEMARK OFFICE
CERTIFICATE OF CORRECTION

PATENT NO.    : 6,893,778 B2
DATED         : May 17, 2005
INVENTOR(S)   : Akiko Fujino et al.

It is certified that error appears in the above-identified patent and that said Letters Patent is hereby corrected as shown below:

Title page,
Item [56], References Cited, FOREIGN PATENT DOCUMENTS, add the following references:
-- JP    2983205 B1    9/1999
   JP    2001-6738     1/2001
   JP    2002-42792    2/2002
   JP    2001-76733    3/2001
   JP    2000-58065    2/2000 --.

Signed and Sealed this

Sixteenth Day of August, 2005

JON W. DUDAS
*Director of the United States Patent and Trademark Office*